United States Patent [19]

Stephens et al.

[11] Patent Number: 5,073,194

[45] Date of Patent: Dec. 17, 1991

[54] PROCESS FOR CONTROLLING THE PRODUCT QUALITY IN THE CONVERSION OF REACTOR FEED INTO IRON CARBIDE

[75] Inventors: Frank A. Stephens, Arvada; John P. Hager, Golden; Frank M. Stephens, Jr., Lakewood, all of Colo.

[73] Assignee: Iron Carbide Holdings, Limited, Lakewood, Colo.

[21] Appl. No.: 561,077

[22] Filed: Aug. 1, 1990

[51] Int. Cl.$^5$ .......................... C22B 5/14; C01B 31/30
[52] U.S. Cl. ........................................ 75/376; 75/446; 75/507; 423/439
[58] Field of Search ................. 75/376, 507, 444, 450, 75/451, 446; 423/439

[56] References Cited

U.S. PATENT DOCUMENTS

Re. 32,247  9/1986  Stephens, Jr. .
3,356,488  12/1967  Walsh .
3,885,023  5/1975  Gray et al. ........................ 423/439
4,053,301  10/1977  Stephens, Jr. .
4,398,945  8/1983  Stephens, Jr. ...................... 75/10.61

Primary Examiner—Melvyn J. Andrews
Attorney, Agent, or Firm—Sheridan Ross & McIntosh

[57] ABSTRACT

A method of controlling product quality in a conversion of reactor feed to an iron carbide-containing product in a fluidized bed reactor. A Mossbauer analysis is performed on product samples leaving the fluidized bed reactor, and a regression analysis is performed on the Mossbauer data. Depending upon the results of the regression analysis, process parameters are adjusted in order to obtain a product having a desired composition. Adjustments are made to the temperature and pressure in the fluidized bed reactor, rate of feed to the fluidized bed reactor, and the composition of the process gas which reacts with the reactor feed in the fluidized bed reactor, dependent upon the analysis results.

21 Claims, 2 Drawing Sheets

PROCESS FOR CONTROLLING THE PRODUCT QUALITY IN THE CONVERSION OF REACTOR FEED INTO IRON CARBIDE

BACKGROUND OF THE INVENTION

1. Field of the Invention

The present invention relates to a method for controlling product quality in a conversion of iron-containing feed material into a product useful in the direct conversion to steel. More particularly, the present invention relates to a method for insuring quality of the product by monitoring the composition of an iron carbide-containing product and adjusting process parameters in direct response thereto.

2. Description of the Related Art

The steel industry has relied on a process that has been in use for many years for the conversion of iron ore into steel. This process involves the conversion of iron ore to pig iron in a blast furnace using coke produced in a coke oven and the subsequent conversion of the pig iron or hot metal to steel in an open hearth or basic oxygen furnace. Though relatively simple, this method has a number of drawbacks, some of which have become potentially devastating to the steel industry in recent years. First, the traditional process of producing steel is energy intensive. With the cost and availability of energy in the near future being unpredictable, the traditional manner of producing steel faces an uncertain future. Second, environmental standards now in place in most industrialized countries make the construction of new traditional-style steel mills impractical. To build such a plant to meet pollution standards or to modify an existing plant to meet the standards would be so expensive as to render the cost of the steel produced non-competitive.

Accordingly, in recent years, a demand has been created for new, relatively clean, energy efficient and less expensive methods for producing steel. In this regard, a great deal of effort has been directed to the elimination of the blast furnace and the coke oven in the steel-making process. Blast furnaces and coke ovens are inherently inefficient, requiring large quantities of energy, and are responsible for a large portion of the pollution from a traditional steel mill. One possible technique that has been studied involves the direct conversion of iron-containing materials to iron carbide followed by the production of steel, thereby eliminating the blast furnace in the production of steel.

Stephens, Jr. U.S. Patent No. Reissue 32,247 discloses such a process for the direct production of steel. In this process, iron ore is converted to iron carbide, $Fe_2C$ and/or $Fe_3C$, and the iron carbide is then converted directly to steel in a basic oxygen furnace or an electric arc furnace, thereby eliminating the blast furnace step altogether. The key to this process is the conversion step, in which iron oxide in the iron ore is reduced and carburized in a single operation using a mixture of hydrogen as a reducing agent and carbon-bearing substances as carburizing agents.

While this method of directly producing steel represents a significant advance in the art, improvements to the method are desirable. Further, a particular need exists for a technique for providing for the quality of the product. It has been found that even minor variations in the process parameters in the converting step will cause undesired results, and that the required parameters are difficult to maintain. Even a minor variation from the appropriate process parameters can cause free carbon (C), free iron (Fe) and/or iron oxides such as $Fe_2O_3$, $Fe_3O_4$ or $FeO$ to be produced rather than iron carbide.

A need clearly exists for an improved conversion method and a method of controlling the conversion and insuring that the final product is acceptable.

SUMMARY OF THE INVENTION

Accordingly, one advantage of the present invention is that the present invention provides a method for controlling the quality of iron carbide-containing product produced using an improved reactor feed conversion technique.

Yet another advantage is that the present invention provides a method for monitoring the composition of the conversion product and adjusting the process parameters in response to the composition.

To achieve the foregoing advantages and in accordance with the purpose of the present invention, as embodied and described herein, a method is provided for monitoring and maintaining quality of a product produced in a fluidized bed reactor mainly comprising iron carbide. The method includes the steps of determining concentrations of individual phases in a sample of the product, determining whether the concentrations of the individual phases are acceptable, and adjusting one or more process parameter to change one or more of the concentrations if the concentrations are determined not to be acceptable.

Preferably, the concentrations are determined through the use of a Mossbauer spectrometer analysis on the product sample, performing a regression analysis on the spectrum generated by the Mossbauer analysis to determine individual concentrations, and normalizing the determined individual phase concentrations to account for estimated purity.

Preferably, the concentrations of Fe, $Fe_3O_4$, $Fe_3C$, FeO and $Fe_2O_3$ are determined. If it is determined that the concentration of Fe is greater than 1 percent, the concentration of $CH_4$ or $H_2$ in a process gas can be adjusted. If it is determined that the concentration of iron oxides is greater than 2 percent, the feed rate of the reactor feed can be decreased. Additionally, if the concentration of FeO is found to be greater then a predetermined quantity, the temperature of the reaction can be lowered.

The results of the Mossbauer analysis, including the spectrum in the individual phases, can be displayed via a printer or display or the like. Preferably, the steps are repeated after a predetermined time delay, and with each repetition of the method, concentration measurements are compared with previous concentration measurements to determine if any trend is developing which can be resolved by adjusting one or more of the process parameters.

The present invention also provides a method of controlling the composition of a product produced by a conversion of reactor feed in a fluidized bed reactor. The method includes the steps of performing a Mossbauer analysis on a sample of converted product, calculating a concentration estimate for predetermined phases in the sample, determining whether the concentration for each phase is acceptable and adjusting process parameters to change the concentrations if the concentrations are not acceptable.

The process parameters which can be controlled include the feed rate of the reactor feed to the fluidized bed reactor, the composition of a process gas introduced into the fluidized bed reactor which interacts with the reactor feed, the temperature in the fluidized bed reactor and the pressure in the fluidized bed reactor. Concentration estimates are preferably obtained for $Fe_3C$, $Fe_2O_3$, $Fe_3O_4$, FeO and Fe.

DESCRIPTION OF THE PREFERRED EMBODIMENT

Figure 1:
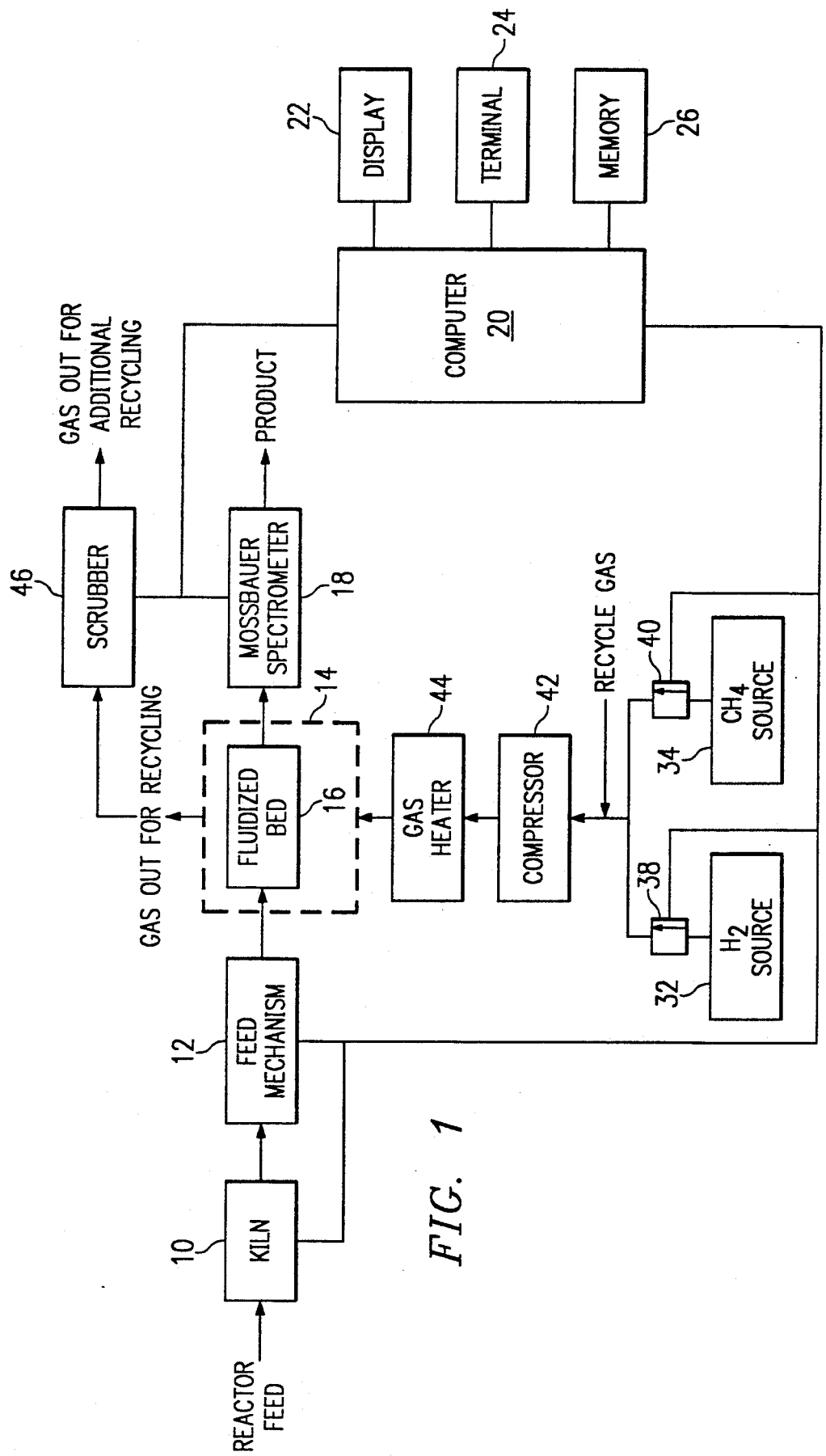
FIG. 1 is a schematic diagram of an embodiment of a system for controlling product quality for use with the present invention.

The present inventors have developed an improved technique for converting iron-containing reactor feed to iron carbide, and more particularly, $Fe_3C$, which is the predominant form of iron carbide produced. The reactor feed is typically a mixture of iron oxides such as magnetite ($Fe_3O_4$) and hematite ($Fe_2O_3$) and other materials, such as gangue and water, rather than consisting entirely of one material. As used herein, the term reactor feed refers to any material useful in the practice of the present invention; for example, iron ore and iron ore concentrate.

The reactor feed is preferably treated prior to conversion. This treatment comprises preheating the reactor feed in an oxidizing atmosphere. Preferably, at least a portion of any magnetite ($Fe_3O_4$) in the reactor feed is converted to hematite ($Fe_2O_3$) in this oxidizing step. This process is described in detail in commonly assigned and copending U.S. patent application Ser. No. 07/561,189, entitled "PROCESS FOR PREHEATING IRON-CONTAINING REACTOR FEED PRIOR TO BEING TREATED IN A FLUIDIZED BED REACTOR" and filed on even date herewith, which is hereby incorporated by reference in its entirety. The inventors have found that a reactor feed having iron oxide mostly in the form of hematite more readily converts to iron carbide than reactor feed comprising mostly magnetite. The preheating step will not only oxidize the magnetite to hematite, but it can also stabilize and/or eliminate sulfur and reduce the amount of free moisture in the reactor feed, thus improving the yield and the efficiency of the conversion.

Additionally, the design of the fluidized bed reactor in which the conversion of the reactor feed to iron carbide takes place has been modified, as described in more detail in commonly assigned and copending U.S. patent application Ser. No. 07/561,076, entitled "FLUIDIZED BED REACTOR AND PROCESS FOR USING SAME", identified by Attorney Docket No. 2206-5, and filed on even date herewith, which is hereby incorporated by reference in its entirety. Baffles have been added to the reactor to create plug flow conditions and regulate residence time of the reactor feed in the reactor, thus reducing problems caused by reactor feed short circuiting the reactor and resulting in unconverted feed material in the product. Plug flow enables utilization of the entire area of the reactor while requiring only a single feed point and a single discharge point. This permits the most efficient use of incoming process gas, since the process gas contacts the reactor feed as it flows through the fluidized bed to efficiently and effectively convert the reactor feed to iron carbide.

The process gas includes both reducing and carburizing agents. Hydrogen gas is preferably used as the reducing gas, although carbon monoxide or hydrocarbon gases or mixtures of hydrogen with carbon monoxide and hydrocarbon gases may be used. Hydrogen gas is preferred as the reducing gas because the oxidation product of hydrogen, water, may be easily removed from the off-gas, thereby providing easier recycling of the off-gas than with other possible reducing gases. Methane is preferred for the carburizing gas, although carbon monoxide, other hydrocarbon gases and solid carbon may be used. Additionally, the source of the methane may be another hydrocarbon gas or a combination of gases that crack or otherwise combine to form methane under the conditions present in the reactor. In theory, a wide range of carbonaceous materials may be employed to supply the carbon necessary for the formation of iron carbide. Whatever gases are actually used to form the process gas, by reacting these gases in rather precise quantities with the reactor feed at certain temperatures and pressures, the reactor feed will be converted to $Fe_3C$, the preferred type of iron carbide.

Regardless of the gas input, the equilibrium gas system comprises five gases. These include water ($H_2O$), carbon monoxide (CO), carbon dioxide ($CO_2$), hydrogen ($H_2$) and methane ($CH_4$), although other gases, such as nitrogen ($N_2$), may be present in the system. In commonly assigned and copending U.S. patent application Ser. No. 07/561,100, entitled "METHOD FOR CONTROLLING THE CONVERSION OF IRON-CONTAINING REACTOR FEED INTO IRON CARBIDE" identified by Attorney Docket No. 2206-7 and filed on even date herewith, which is incorporated herein by reference in its entirety, a process for controlling the conversion based on the composition of the five gas equilibrium system is disclosed.

As discussed above, a major problem with the conversion of reactor feed is the difficulty in achieving high conversion to iron carbide. Equilibrium constraints result in the formation of products other than iron carbide when even minor deviations in process parameters take place. At higher temperatures, residual oxygen can remain in the product in the form of wustite, which can limit the efficiency of the conversion of the product to steel. While a small amount of non-iron carbide material is desired in the product to act as slag in the conversion of the product to steel in the appropriate furnace, too much non-iron carbide material results in an inefficient conversion to steel, requiring additional amounts of energy for the conversion.

Among the factors that can affect the product are the composition of the reactor feed being fed into the fluidized bed reactor and the rate at which the reactor feed is fed into the fluidized bed reactor. For example, if no oxidizing and preheating or minimal oxidizing and preheating takes place, sulfur in the reactor feed will not be eliminated, reducing the yield of iron carbide in the final product. Similarly, water in the reactor feed might not be eliminated, thereby disturbing the equilibrium and reducing the efficiency of the process of converting the reactor feed to iron carbide. Further, if the feed rate of the reactor feed to the fluidized bed is too fast, the reactor feed does not spend enough residence time in the fluidized bed, thereby resulting in unconverted reactor feed in the product.

Similarly, a feed rate which is too slow will waste energy and material. After a certain amount of residence time in the fluidized bed, which can be calculated for the particular reactor feed, additional time spent by the reactor feed in the reactor bed will cause no additional reactor feed to be converted to iron carbide or will cause such a small amount to be converted to iron carbide that the return for that time is minimal, i.e., the efficiency of the overall process is reduced and the cost in energy and conversion material is not worth the additional iron carbide converted.

The present invention resolves these problems by using a highly particularized control system. Referring to FIG. 1, the system for controlling the quality of the product is illustrated. Reactor feed is preferably preheated and oxidized in a kiln 10 or like device and then is fed via a feed mechanism 12 into a fluidized bed 14. More specifically, the reactor feed is fed into a fluidized bed 16 of the design discussed above contained in the fluidized bed reactor 14. Process gas is fed through the fluidized bed 16 via a windbox (not shown) beneath the fluidized bed 16. Depending upon the pressure, temperature, and composition of the process gas, the reactor feed reacts with the process gas to convert the reactor feed to iron carbide. Upon leaving the fluidized bed 16, samples of the converted product are analyzed in a Mossbauer spectrometer 18. Data from the Mossbauer spectrometer 18 is fed to a computer 20, which calculates the composition of the sample based on the Mossbauer data.

One method by which the computer 20 may calculate the composition of the sample is by a regression analysis technique. In this technique, raw spectrum data is analyzed by a program running on the computer 20. It is known that each phase in a sample has its own individual spectrum in the overall spectrum. The computer 20 locates and identifies the individual spectrum, and integrates the area under the curve for the individual spectrum. The analysis for the overall composition of the sample is then adjusted for the estimated purity of the sample. This is required because typically the phases analyzed will include iron compounds such as $Fe_3C$, $Fe_2O_3$, $Fe_3O_4$, FeO and Fe, but there will typically be other non-iron phases in the sample which are not measured by Mossbauer spectrometry but which can be determined by chemical or x-ray fluorescence analysis. Accordingly, the calculated concentrations are normalized at the estimated purity of the sample.

Based on the composition of the sampled product, the computer 20 can be programmed to adjust the process parameters. Alternatively or additionally, the computer 20 may be programmed to display the results of the regression analysis at a display 22, which can comprise a CRT, printer or the like. If the composition of the sampled product is not satisfactory, the computer 20, if so programmed, or an operator, via the computer 20 through a terminal 24, can take steps to adjust the process parameters in order to change the composition of the product.

For example, if the Mossbauer analysis has indicated that the product contains too much iron oxide (i.e., FeO, $Fe_2O_3$, $Fe_3O_4$), then the computer 20 can cause the feed mechanism 12 to slow the feed rate of the reactor feed into the fluidized bed 16, thereby increasing the reaction time for any given portion of reactor feed and more fully converting the feed to iron carbide. Typically, up to 2% iron oxide is acceptable, as the iron oxide acts as slag in the conversion of the product to steel. More than about 2% iron oxide in the product causes unnecessary additional energy to be required to convert the product to steel.

Alternatively, should the iron carbide composition be unnecessarily high, the computer 20 can cause the feed mechanism 12 to increase the feed rate of the reactor feed to the fluidized bed 16 to reduce residence time in the fluidized bed 16. Lower iron carbide concentrations may be acceptable if the result would be lower energy and material costs and faster processing of the reactor feed and, therefore, higher production rates. Depending on the concentration of other phases, the iron oxide concentration may be too low if it is less than 0.5% to 1.5%.

In the reactor feed, it is expected that as much as 4 percent of the feed may be gangue. Due to the conversion process, the amount of gangue in the product may increase by as much as 50 percent of the concentration of the gangue in the feed. It is for this reason that the gangue content of the sample is taken into account during the regression analysis.

Of significant importance to the process is the concentration of metallic iron (Fe) in the product. It is expected and acceptable if the concentration of metallic iron in the product is as high as 1 percent by weight. However, if the Mossbauer analysis indicates that the metallic iron concentration exceeds 1%, then one or more process parameters should be adjusted to reduce this concentration.

The computer 20 can also control a number of other process parameters in response to an unsatisfactory analysis of the product sample. For example, should the metallic iron concentration exceed 1%, the Fe content can be lowered by increasing the amount of $CH_4$ and/or reducing the amount of $H_2$ in the process gas. The computer 20 can control the amount of $H_2$ gas and $CH_4$ gas which is added to the recycled off-gas to comprise the process gas. These gases are supplied by respective sources 32, 24, and the amount of each gas permitted to be added into the process gas is controlled by respective computer controlled valves 38, 40. Accordingly, by controlling the valves 38 and 40, the amount of $H_2$ and $CH_4$ entering the process gas can be controlled. As will be appreciated, other desired gases may be added to the process gas and controlled in an analogous manner.

Should the analysis indicate that excess FeO is present in the product sample, a number of steps can be taken to remedy this situation. For example, FeO will typically only form if the reaction temperature is above approximately 600° C. Accordingly, by lowering the reaction temperature to below about 600° C., FeO in the product can be eliminated. This can be accomplished by lowering the temperature to which a gas heater 44 heats the process gas prior to being introduced to the fluidized bed reactor 16. Alternatively, the temperature to which the kiln 10 heats the reactor feed can be decreased to lower the temperature. Additionally, slowing of the feed rate and/or increasing the amount of $CH_4$ and decreasing the amount of $H_2$ added to the process gas can cause less FeO to be present in the product.

Similarly, another potential alternative to decreasing the feed rate when an excess of iron oxides is found in the product sample would be to increase the amount of $H_2$ in the process gas. This will cause additional oxygen to be removed from the reactor feed in the form of the water during the reaction. Further, the recycling of the off-gas may be adjusted to decrease the amount of $H_2O$ in the recycled off-gas. For example, lowering the temperature of cooling water in a scrubber 46, the temperature of the off-gas is reduced, thereby and reducing the amount of $H_2O$ in the off-gas.

Depending on the analysis of the Mossbauer spectrometer, a combination of the above actions may be required or manipulation of only a single process parameter may be necessary to adjust the product composition.

As discussed above, an operator can read the results of the Mossbauer analysis on the display 22 and input any appropriate changes to be carried out by the computer 20 through the terminal 24 rather than relying on the computer 20 to automatically make these changes. The system can be designed so that the operator can either override the computer 20 or work in conjunction with the computer 20.

Figure 2:
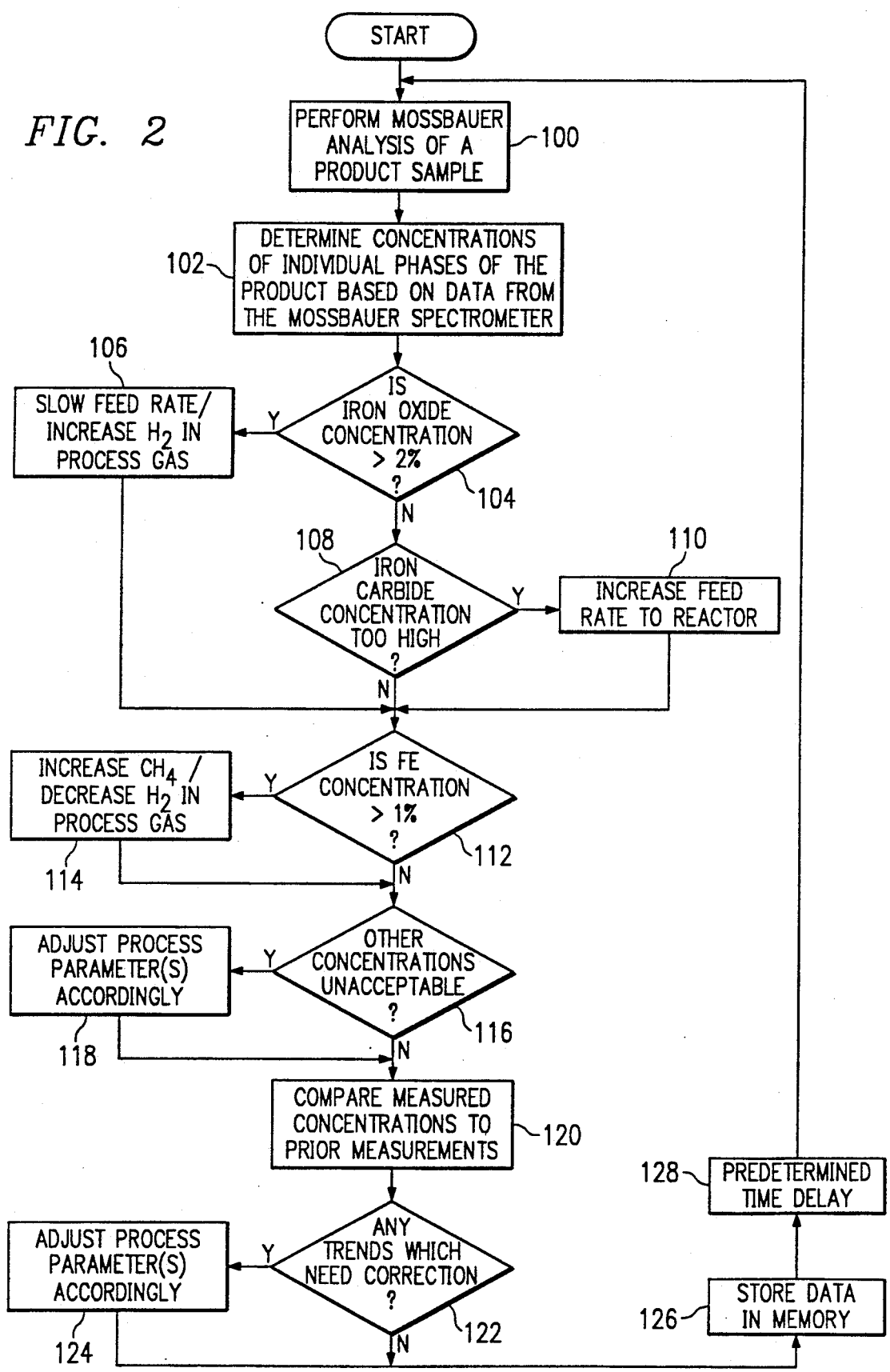
FIG. 2 illustrates a flow chart of an embodiment of the process according to the present invention.

The process for maintaining quality of the product produced in the conversion process will now be described with additional reference to the flowchart of FIG. 2.

Following the reaction of the reactor feed with the process gas, a sample of the reaction product is removed and analyzed in the Mossbauer spectrometer 18 (step 100). The results of this analysis are fed to the computer 20, which determines the individual concentrations of the individual phases in the product, e.g. using the regression analysis technique described above (step 102). The computer 20 then compares the concentration levels to acceptable parameters for the product, which are stored in the memory 26 (steps 104, 108 and 112). For example, if the computer 20 determines that the concentration of iron oxide is greater than 2 percent (step 104), then the computer 20 may cause the feed mechanism 12 to slow down the rate at which reactor feed is fed into the fluidized bed 16 (step 106). This will increase the time the reactor feed spends in the fluidized bed 16, thereby allowing additional reactor feed to be converted to iron carbide. Alternatively, the amount of $H_2$ in the process gas can be increased to react with oxygen and form water (step 106). Conversely, should the iron carbide concentration be greater than a predetermined concentration, indicating that too much time is being spent in the fluidized bed 16 (step 108), the computer 20 can cause the feed mechanism 12 to increase the rate at which the reactor feed is fed to the fluidized bed 16 (step 110).

Additionally, the concentration of Fe in the sample is compared to a maximum allowable concentration, which is preferably 1% (step 112). If it is determined that the concentration of Fe is too high, then the computer 20 increases the $CH_4$ in the process gas or decreases the $H_2$ (step 114), as discussed above.

As noted above, the computer 20 may be programmed to monitor a number of other concentrations (step 116). Depending on the findings, the computer 20 will adjust the process parameters accordingly to change the composition of the product (step 118).

As discussed above, adjustments can be made if the computer 20 is able to determine that a trend has developed which will lead to unacceptable concentrations of certain phases in the product. In step 120, the computer 20 compares the concentrations from the prior sample or a series of prior samples to determine if a trend has developed (step 122) The computer 20 can adjust the process parameters accordingly prior to the production of any sub-standard product (step 124). For example, if the iron oxide concentration in consecutive samples has been slowly increasing to close to 2% of the sample, the computer 20 can adjust the feed rate and thereby prevent a product having an unacceptable level of iron oxide from being produced.

Data from the analysis is then stored in memory 26 for use in future analysis and the construction of historic lines to aid in control of the conversion process (step 126).

After the computer 20 has completed its analysis, a new sample can be taken immediately or after a predetermined period of time has passed (step 128).

Actual removal of the sample from the product leaving the fluidized bed 16 can be performed mechanically or by an operator. In any case, the sample is transferred to the Mossbauer spectrometer 18 for analysis. Additionally, rather than a computer making the changes, concentration data obtained from the Mossbauer analysis can be displayed on the display 22 to be read by an operator. The operator can then input changes to the process parameters through a terminal 24, and command the computer 20 to make the appropriate changes. Alternatively, the computer 20 can be programmed to make the changes automatically, with the operator having the ability to override any command or make certain parameter adjustments deemed to be outside the control limits set by the computer programs.

While one embodiment of the invention has been discussed, it will be appreciated by those skilled in the art that various modifications and variations are possible without departing from the spirit and scope of the invention, as defined by the claims.

We claim:

1. A method for monitoring and maintaining the quality of a product mainly comprising iron carbide produced in a fluidized bed reactor from reactor feed, said method comprising the steps of:
   (a) determining concentrations of individual phases in a sample of the iron carbide-containing product;
   (b) determining whether the concentrations of the individual phases of the product are acceptable; and
   (c) adjusting one or more process parameter to change one or more of the concentrations if the concentrations are determined not to be acceptable in said step (b).

2. A method according to claim 1, wherein said step (a) comprises the substeps of:
   (i) conducting a Mossbauer analysis of the sample of the product,
   (ii) performing a regression analysis of results of the Mossbauer analysis to determine the individual phase concentrations, and
   (iii) normalizing the determined individual phase concentrations to account for estimated product purity.

3. A method according to claim 1, wherein said step (a) comprises determining concentrations of Fe, $Fe_3O_4$, $Fe_3C$, FeO and $Fe_2O_3$.

4. A method according to claim 3, wherein said step (b) further comprises determining whether the concentration of Fe is greater than 1%, and said step (c) further comprises adjusting at least one of a concentration of $CH_4$ and a concentration of $H_2$ in a process gas if the concentration of Fe is determined to be greater than 1%.

5. A method according to claim 3, wherein said step (b) further comprises determining whether a combined concentration of FeO, $Fe_2O_3$ and $Fe_3O_4$ is greater than 2%, and said step (c) further comprises decreasing a feed rate of the reactor feed into the fluidized bed reactor if the combined concentration is greater than 2%.

6. A method according to claim 3, wherein said step (b) further comprises determining whether the concentration of FeO is greater than a desired quantity, and wherein said step (c) further comprises lowering a reaction temperature if it is determined that the concentration of FeO is greater than the desired quantity.

7. A method according to claim 1, further comprising, prior to said step (c), the step of displaying the individual concentrations on a display.

8. A method according to claim 2, further comprising, following said step (a), the step of (e) displaying the spectrum from the Mossbauer analysis and displaying the normalized individual phase concentrations.

9. A method according to claim 1, further comprising the step of repeating said steps (a), (b) and (c) after a predetermined time delay.

10. A method according to claim 1, further comprising the steps of:
  (i) comparing the concentrations of individual phases with previously determined concentrations to determine if any detrimental trend is developing; and
  (ii) adjusting one or more of the process parameters to change one or more of the concentrations if it is determined that a detrimental trend exists.

11. A method according to claim 1, wherein the process parameters include a feed rate to the fluidized bed reactor, composition of a process gas, temperature in the fluidized bed reactor, and pressure in the fluidized bed reactor.

12. A method of controlling the composition of an iron carbide-containing product produced during a conversion of reactor feed in a fluidized bed reactor to the product, comprising the steps of:
  (a) performing a Mossbauer analysis on a sample of converted product exiting the fluidized bed reactor;
  (b) separating individual phase spectra and integrating each individual spectra to obtain a concentration estimate for desired phases in the sample;
  (c) determining whether the product is acceptable based on the relative concentrations for each phase; and
  (d) adjusting process parameters to change the relative concentrations if the relative concentrations are determined not to be acceptable.

13. A method of controlling the composition of a product according to claim 12, wherein said process parameters include a feed rate to the fluidized bed reactor, composition of a process gas introduced into the fluidized bed reactor, temperature in the fluidized bed reactor, and pressure in the fluidized bed reactor.

14. A method of controlling the composition of a product according to claim 12, wherein the individual phase spectra include spectra for $Fe_3C$, $Fe_2O_3$, $Fe_3O_4$, FeO and Fe.

15. A method of controlling the composition of a product according to claim 12, further comprising, following said step (b), the step of displaying the individual phase spectra graphically.

16. A method of controlling the composition of a product according to claim 12, further comprising, following said step (b), the step of displaying the integrate individual spectra graphically against an optimum individual spectra.

17. A method of controlling the composition of a product according to claim 12, wherein said step (c) further comprises determining whether the concentration of iron oxide in the product is greater than 2%, and said step (d) comprises decreasing a feed rate if it is determined that the concentration of the iron oxide is greater than 2%.

18. A method of controlling the composition of a product according to claim 12, wherein said step (c) further comprises determining whether the concentration of metallic iron in the product is greater than 1%, and said step (d) further comprises adjusting the composition of a process gas if it is determined that the concentration of metallic iron is greater than 1%.

19. A method of controlling the composition of a product according to claim 12, further comprising the step of repeating said steps (a) through (d) after a desired period of time.

20. A method of controlling the composition of a product according to claim 12, wherein the individual phase spectra include spectra for $Fe_3C$, $Fe_2O_3$, $Fe_3O_4$, FeO and Fe, and wherein said step (c) further comprises determining whether the concentration of $Fe_3C$ is greater than a desired quantity, and said step (d) further comprises increasing a feed rate if it is determined that the concentration of the $Fe_3C$ exceeds the desired quantity.

21. A method of controlling the composition of a product according to claim 12, wherein said step (b) further comprises obtaining a concentration estimate for FeO, and wherein said step (c) further comprises determining whether the concentration of the FeO is above a desired limit, and wherein said step (d) further comprises decreasing a temperature in the fluidized bed reactor if it is determined that the concentration of FeO is above the desired limit.

* * * * *

UNITED STATES PATENT AND TRADEMARK OFFICE
CERTIFICATE OF CORRECTION

PATENT NO. : 5,073,194
DATED : December 17, 1991
INVENTOR(S) : Stephens et al.

It is certified that error appears in the above-identified patent and that said Letters Patent is hereby corrected as shown below:

Column 6, line 37, please delete "32,24" and insert therefor -- 32,34 --.

Signed and Sealed this

Sixth Day of April, 1993

*Attest:*

STEPHEN G. KUNIN

*Attesting Officer*     *Acting Commissioner of Patents and Trademarks*